April 29, 1969     D. D. LIEDEL     3,440,898
REMOTE CONTROLLED MIRROR
Filed April 7, 1967
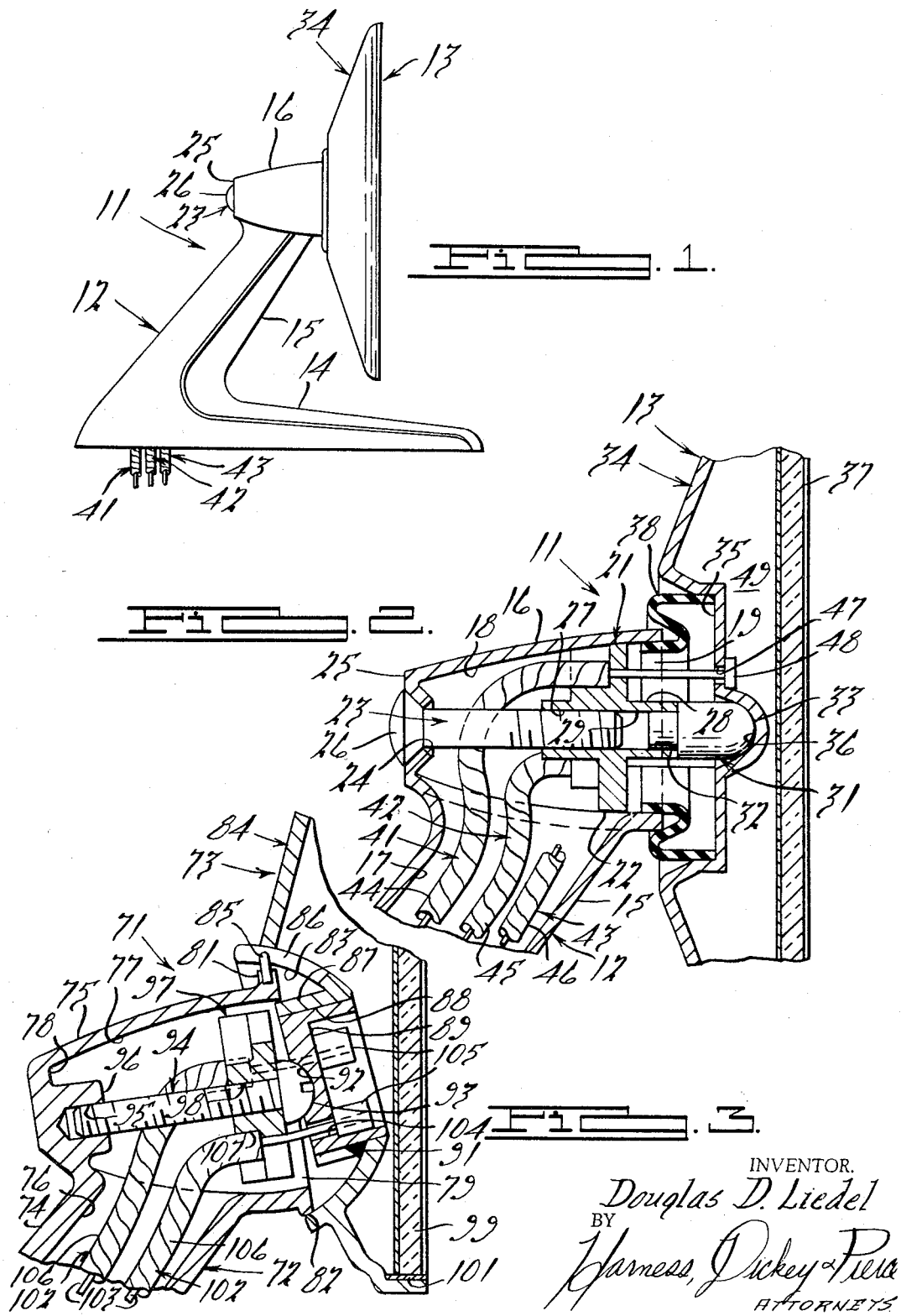
INVENTOR.
Douglas D. Liedel
BY
Harness, Dickey & Pierce
ATTORNEYS United States Patent Office 3,440,898
Patented Apr. 29, 1969

3,440,898
REMOTE CONTROLLED MIRROR
Douglas D. Liedel, Belleville, Mich., assignor to C. M. Hall Lamp Company, a corporation of Michigan
Filed Apr. 7, 1967, Ser. No. 629,177
Int. Cl. F16c 1/10
U.S. Cl. 74—501                                           4 Claims

ABSTRACT OF THE DISCLOSURE

Two embodiments of remote controlled, compact mirror assemblies are set forth. In each embodiment the mirror assembly is comprised of a mounting portion having an upright member that defines a cavity opening through one of its ends. A relatively compact supporting member is affixed within this cavity and is connected to a journal member defining a generally hemispherical surface. A frame member is formed with a generally hemispherical cavity that is journaled upon the mounting portion journal member and is connected at its periphery to a mirror. Flexible transmitters are connected to the mirror frame at points spaced about its journal cavity for remote control actuation of the mirror.

Background of the invention

This invention relates to rear view mirrors and more particularly to a compact, remote controlled rear view mirror.

Rear view mirrors for motor vehicles are generally comprised of a mounting portion that is adapted to be fixed to the vehicle and a mirror that is pivotally supported upon the mounting portion for adjustment to suit individual driver's requirements. This general type of construction is employed with either inside or outside mounted rear view mirrors. The invention disclosed herein is particularly adapted for use in connection with an outside mounted rear view mirror and particularly one that is adapted for remote control operation. It is to be understood, however, that certain of the inventive features disclosed herein may find application with either inside or outside mounted mirrors, remote or non-remote operated mirrors or mirrors adapted for uses other than in connection with motor vehicles.

Previously proposed outside mounted remote controlled rear view mirrors have been relatively bulky constructions due to the mounting arrangement employed for the mirror. One common mirror of this type has comprised a mounting portion that is adapted to be affixed to the exterior vehicle body sheet metal and which defines an upstanding portion that terminates in an enlarged shroud. The reflective portion of the mirror has been supported for pivotal movement within this shroud and a remote control actuating device in the form of a plurality of flexible transmitters has passed through the mounting portion for connection at one end to the mirror. The support for the mirror and respective ends of the flexible transmitter in this conventional type of construction has been a relatively bulky element that has an extending leg which is connected to the mounting portion and a head upon which the mirror reflective surface is pivotally supported and to which the protective sheaths of the flexible transmitters are affixed. It is the use of a bulky supporting member of this type and the reliance upon a separate protective shroud for the mirror that has resulted in the relatively large size of previously proposed mirror assemblies of this type.

It is, therefore, a principal object of this invention to provide an improved, compact rear view mirror assembly.

It is another object of this invention to provide an improved, compact supporting mechanism for a mirror that particularly adapts itself to remote control operation.

It is a further object of this invention to provide an improved, compact remote controlled mirror assembly for a motor vehicle.

Summary of the invention

This invention is particularly adapted for embodiment in a rear view mirror for a motor vehicle. The mirror includes a fixed mounting portion that defines a cavity that opens through one end of the mounting portion. A support member is fixed relative to the mounting portion and substantially within the cavity. A first journal member fixed relative to the support member and juxtaposed to the opening coacts with a second journal member that is affixed to a mirror having a reflective surface for supporting the mirror for universal pivotal movement upon the mounting portion.

Brief description of the drawings

FIGURE 1 is a side elevational view of a remote controlled rear view mirror assembly for a motor vehicle embodying this invention.

FIGURE 2 is an enlarged cross-sectional view of the mirror shown in FIGURE 1 showing the supporting arrangement of the mirror assembly.

FIGURE 3 is a cross-sectional view, in part similar to FIGURE 2, showing another embodiment of the invention.

Detailed description of the preferred embodiments

In FIGURES 1 and 2 the reference numeral 11 generally indicates a portion of a remote controlled rear view mirror assembly for a motor vehicle embodying this invention. The mirror assembly 11 is comprised of a mounting member 12 and mirror head assembly 13 that is pivotally mounted upon the upper end of the mounting member 12.

The mounting member 12 may be formed as a single piece die casting and consists of an elongated base 14 that is adapted to be affixed to a part of the exterior sheet metal of a motor vehicle body such as a portion of the door on the driver's side. An elongated post 15 extends upwardly and rearwardly from the forward end of the base 14 and terminates at its upper end in a generally bullet-shaped portion 16. A cavity 17 (FIGURE 2) extends through the forward end of the base 14 and through the post 15. The cavity 17 intersects a generally cylindrical cavity 18 formed in the portion 16. The cavity 18 terminates in a generally circular opening 19 formed at the rear end of the portion 16.

A generally annular shaped supporting member 21 is positioned substantially within the cavity 18. The supporting member 21 has an outer surface 22 that is complementary in shape to the adjacent surface of the portion 16 defining the cavity 18. An elongated threaded fastener 23 has its shank extending through an opening 24 in an end wall 25 of the portion 16, which end wall lies opposite the opening 19. A head 26 of the fastener 23 engages the end wall 25 and the shank is threaded into a tapped opening 27 formed in the supporting member 21 to fix the supporting member 21 relative to the base member 12 and within the opening 18.

The supporting member 21 is formed with a cylindrical projection 28 that extends forwardly from the surface 22 toward and through the opening 19. A cylindrical bore 29 is formed in the portion 28 concentrically with the tapped opening 27. A journal member 31 has a reduced diameter cylindrical portion 32 received in the supporting member opening 29 and an enlarged headed portion that defines a generally hemispherical journal surface 33.

A die cast frame member 34 of the mirror head assembly 13 defines a generally cylindrical recess 35 having a hemispherical socket portion 36 formed at its center. The socket portion 36 is journaled upon the surface 33 for universal pivotal movement of the mirror head assembly 13 with respect to the mounting portion 12. A mirror 37 of any known type and having a rearwardly facing reflecting surface is fixed to the outer periphery of the frame 34 in any known manner, as by an adhesive bond (not shown). A flexible boot or seal 38 encircles the frame recess 35 and extends into the mounting portion opening 19 to preclude the entry of dirt, moisture or other foreign matter.

The angular position of the mirror head assembly 13 with respect to the mounting member 12 may be adjusted from a remote location through a plurality of flexible transmitters 41, 42 and 43. The transmitters 41, 42 and 43 include protective sheaths 44, 45 and 46, respectively, that are received in complementary openings in the supporting member 21 and are fixed therein. The respective wires of the flexible transmitters 41, 42 and 43 extend through circumferentially spaced openings 47 (only one of which appears in FIGURE 2) in the mirror frame portion 35 and terminate in headed fasteners 48 within a cavity 49 defined between the rear face of the mirror 37 and the frame 34. The opposite ends of the wires of the flexible transmitters 41, 42 and 43 are connected in any known manner to a remote control device of any know type that is positioned within the interior of the vehicle with which the mirror assembly 11 is associated. This remote control device preferably includes some form of tensioning spring or the like for maintaining a tension on the wires of the flexible transmitters 41, 42 and 43 to maintain the socket opening 36 in engagement with the journal surface 33 and to facilitate the remote control operation. Since the specific construction of the remote control mechanism forms no part of this invention, it will not be described in further detail.

A remote controlled mirror assembly showing another embodiment of the invention is identified generally by the reference numeral 71 in FIGURE 3. The mirror assembly 71 is comprised of a mounting member 72 and mirror head assembly 73 that is supported for universal pivotal movement on the upper end of the mounting member 72. Like the embodiment shown in FIGURES 1 and 2, the mounting member 72 may be a unitary die casting and has a base portion (not shown) that is adapted to be fixed to the exterior sheet metal of a motor vehicle body. The base portion has an upwardly extending mounting post portion 74 that terminates in a bullet shaped portion 75. A central cavity 76 extends through the post portion 74 and terminates at a generally cylindrical cavity 77 formed in the portion 75. One end of the cavity 77 is closed by an integral wall 78 of the portion 75 and the other end defines a generally circular opening 79.

The end of the portion 75 adjacent the opening 79 is formed with an outwardly extending flange 81 that defines an outer surface 82, which surface is a segment of a sphere. A complementary cavity 83 of a mirror head assembly frame member 84 is journaled upon the surface 82 for universal pivotal movement. A pin 85 extends outwardly from the flange 81 and is received in a complementary groove 86 formed in the portion of the frame defining the cavity 83 to preclude rotation of the frame 84 with respect to the mounting portion 75 without interfering with the pivotal movement.

A cylindrical projection 87 is formed at the center of the cavity 83 integrally with the frame 84. The projection 87 extends inwardly toward the cavity 79 and defines a cylindrical opening 88. A generally cup shaped journal member 89 is affixed within the cavity 88, as by a weld 91. The journal member 89 defines a cavity 92 having a segmented spherical shape. The cavity 92 bears against a complementary head portion 93 of a threaded fastener 94 to further journal the mirror head assembly 73 on the mounting member 72. The threaded fastener 94 is received in a tapped opening 95 formed in a cylindrical inwardly extending projection 96 of the wall 78.

A supporting member, indicated generally by the reference numeral 97 and having a generally cylindrical shape, is formed with a tapped opening 98 which threadingly receives the fastener 94. The head 93 engages the supporting member 97 to axially affix the member 97 with respect to the remaining components of the assembly.

A mirror 99 is affixed to the outer periphery of the frame 84, as by an adhesive bond 101. The angular position of the mirror 99 and frame 84 with respect to the mounting member 72 is adjusted by means of a plurality of flexible transmitters 102 and a control mechanism that operates wires 103 of the transmitters 102 from a remote location. As in the previously described embodiment, the control (not shown) may be of any known type and preferably is positioned within the passenger compartment of the vehicle with which the mirror assembly 91 is associated. Each of the wires 93 has a portion that extends through a respective one of circumferentially spaced openings 104 in the journal member 89 and is affixed against axial movement with respect to the journal member 89 by a fastener 105 or the like. Suitable tensioning means (not shown) are provided to tension the wires 103 and to maintain the cavity 92 in engagement with the fastener head 93. Protective sheaths 106 of the flexible transmitters 102 are received and fixed in complementary openings 107 formed in the supporting member 97.

The supporting member 97 is cantilevered on the end of the threaded fastener 94. Bending of the threaded fastener 94 may be precluded by extending the outer periphery of the supporting member 97 into engagement with the portion of the mounting member 72 that defines the cavity 77 as in the previously described embodiment. In the absence of such a construction, bending will nevertheless be precluded by the coaction between the fastener head 93, journal member 89 and the coaction between the frame 87 and the mounting member surface 82.

While it will be apparent that the preferred embodiments of the invention disclosed are well calculated to fulfill the objects above stated, it will be appreciated that the invention is susceptible to modification, variation and change without departing from the proper scope of fair meaning of the subjoined claims.

What is claimed is:

1. A rear view mirror comprising a relatively fixed mounting portion defining a cavity opening through one end of said mounting portion, a support member, threaded fastening means threadingly received in said support member for fixing said support member relative to said mounting portion and substantially within said cavity, said threaded fastening means including a head juxtaposed to said cavity opening and having the shape of a segment of a sphere, a mirror having a reflective surface, a frame fixed to said mirror around the periphery of said mirror, a journal member affixed to said frame and supporting said frame and said mirror for universal pivotal movement upon said head of said threaded fastening means, said mounting portion defining an outwardly extending flange around said cavity opening, said frame having a bearing portion engaged with said mounting portion flange, pin means fixed to said mounting portion flange, and slot means formed in said frame for receiving said pin means for precluding rotational movement of said frame with respect to said mounting portion flange without interferring with the universal pivotal movement of said mirror.

2. A rear view mirror comprising a relatively fixed mounting portion defining a cavity opening through one end of said mounting portion, a support member, means fixing said support member relative to said mounting portion and substantially within said cavity, the outer periphery of said support member being no greater in size than the adjacent area of the mounting portion defining said cavity for containing said support member substantially within said cavity, a first journal member fixed relative to said support member and juxtaposed to said cavity opening, a mirror having a reflective surface, a frame for said mirror, means for affixing said frame to said mirror around the periphery of said mirror, said frame having a portion extending inwardly from the periphery of said mirror toward said mounting portion and terminating outwardly of said mounting portion and adjacent said cavity opening, a second journal member fixed relative to said frame and juxtaposed to said cavity opening, said journal members cooperating for supporting said mirror and said frame for universal pivotal movement upon said mounting portion, and a protective member extending between said inwardly extending portion of said frame and said mounting portion for precluding the ingress of foreign material to said mounting portion cavity and to journal members.

3. A rear view mirror as set forth in claim 2 wherein the protective member comprises a flexible boot extending at one end into said cavity.

4. A rear view mirror as set forth in claim 2 wherein said protective member comprises a bearing portion formed by the frame at the termination of said inwardly extending portion and a cooperating outwardly extending flange formed by the mounting portion adjacent the cavity opening.

References Cited

UNITED STATES PATENTS

| | | |
|---|---|---|
| 2,917,972 | 12/1959 | Bonaguro. |
| 3,046,840 | 7/1962 | Barcus. |
| 3,046,841 | 7/1962 | Kawecki _____ 74—501 |
| 3,183,736 | 5/1965 | Jacobson _____ 74—501 |
| 3,195,369 | 7/1965 | Warhol _____ 74—501 |
| 3,198,071 | 8/1965 | Gosling _____ 74—501 XR |
| 3,225,621 | 12/1965 | Augunas _____ 74—501 |

FRED C. MATTERN, JR., *Primary Examiner.*

MANUEL ANTONAKAS, *Assistant Examiner.*